United States Patent
Saunders

(10) Patent No.: US 6,317,236 B1
(45) Date of Patent: Nov. 13, 2001

(54) METHOD AND APPARATUS FOR TRANSMITTING AN INTERNET PROTOCOL (IP) PACKET WITHIN A FIBER OPTIC NETWORK

(75) Inventor: Ross Alexander Saunders, Scotland (GB)

(73) Assignee: Cisco Photonics Italy, S.r.L., Milan (IT)

( * ) Notice: Subject to any disclaimer, the term of this patent is extended or adjusted under 35 U.S.C. 154(b) by 0 days.

(21) Appl. No.: 09/161,424

(22) Filed: Sep. 24, 1998

(51) Int. Cl.$^7$ .................................................. H04B 10/00
(52) U.S. Cl. ........................ 359/158; 359/173; 359/181
(58) Field of Search ................... 359/158, 118, 359/173, 181, 184; 375/282, 333

(56) References Cited

U.S. PATENT DOCUMENTS

| | | | |
|---|---|---|---|
| 5,339,185 | 8/1994 | Kaede | 359/158 |
| 5,592,519 | 1/1997 | Honaker, Jr. | 375/373 |
| 5,602,862 | 2/1997 | Barnsley et al. | 372/45 |
| 5,689,530 | 11/1997 | Honaker, Jr. | 375/286 |
| 5,754,325 | 5/1998 | Michishita | 359/176 |
| 5,760,937 | 6/1998 | Ishikawa et al. | 359/135 |
| 5,764,396 | 6/1998 | Yoneyama | 359/176 |
| 5,774,002 | 6/1998 | Guo et al. | 327/165 |
| 6,233,075 | * 5/2001 | Chang et al. | 359/124 |
| 6,233,235 | * 5/2001 | Burke et al. | 370/356 |

OTHER PUBLICATIONS

M. Ajmone Marsan, et al., Daisy: a scalable all–optical packet network with multifiber ring topology, Jun. 22, 1998, in Computer Networks and ISDN Systems, vol. 30, No. 11, pp. 1065–1082.

M. Renaud, et al., Network and System Concepts for Optical Packet Switching, Apr. 1, 1998, in IEEE Communications Magazine, vol. 35, No. 4, pp. 96–102.

Electronics Letters, Mar. 5, 1998, vol. 34, No. 5, All–Fibre–Optic Clock Recovery from Non–Return–To–Zero Format Data, pp. 478 –480.

Electronics Letters, Feb. 5, 1998, vol. 34, No. 3, Passive All–Optical Clock Signal Extractor for Non–Return–To–Zero Signals, pp. 295 –297.

Photonics Technology Letters, Apr. 1998, vol. 10, No. 4., A Simple High–Speed High–Output Voltage Digital Reciever, pp. 588 –590.

IEEE Journal of Solid–State Circuits, Oct. 1991, vol. 26, No. 10, A PLL–Based 2.5 Gb/s GaAs Clock and Data Regenerator IC, pp. 1345 –1353.

\* cited by examiner

Primary Examiner—Kinfe-Michael Negash
(74) Attorney, Agent, or Firm—Oblon, Spivak, McClelland, Maier & Neustadt, P.C.

(57) ABSTRACT

An embodiment includes an optical source, an optical receiver, and an interconnecting optical fiber. A data sequence is received and encoded or formatted as an IP packet using an encoding format capable of returning a signal representing the IP packet to a predetermined value at the beginning of each bit period of the IP packet at a physical layer of the network. The encoded IP packet is then transmitted directly over an optical layer of the network without adapting the IP packet to another encoding format or using an adaptation layer in the network (e.g., at a data link layer or higher). The optical receiver receives the IP packet and then a clock signal is extracted without the overhead and costs associated with additional adaptation or encoding of the IP packet. When the optical source is in an idle state, a mark-hold state (more generally called a filler signal) is formatted with the same encoding format and transmitted to the optical receiver directly over the optical layer in order to maintain a synchronous clock during the idle state.

22 Claims, 4 Drawing Sheets

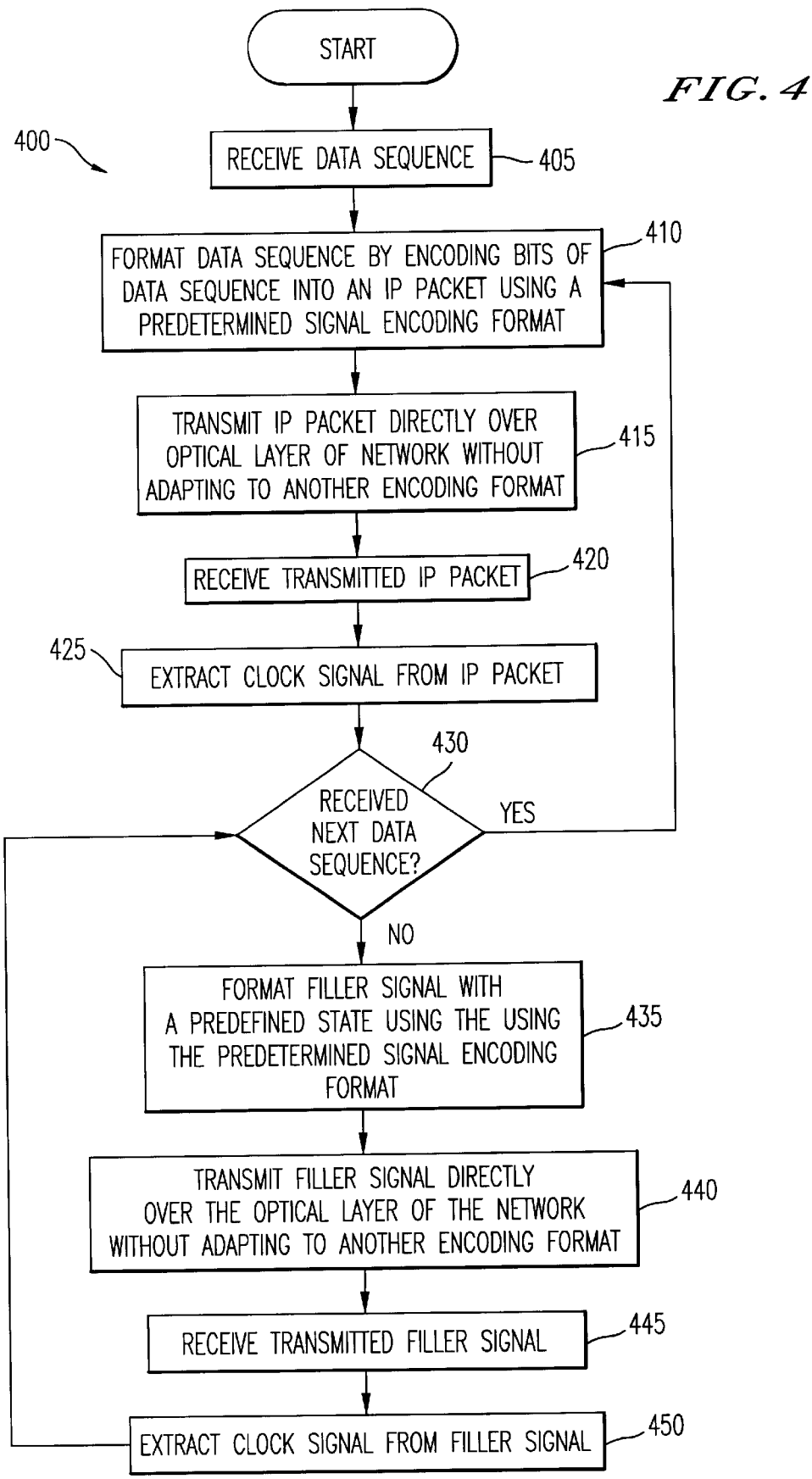

METHOD AND APPARATUS FOR TRANSMITTING AN INTERNET PROTOCOL (IP) PACKET WITHIN A FIBER OPTIC NETWORK

BACKGROUND OF THE INVENTION

The present invention relates generally to systems for transmitting data over fiber optic networks, and specifically to systems for transmitting an encoded Internet protocol (IP) packet directly over an optical or photonic layer of a fiber optic network without the overhead and expense of adapting the IP packet to another encoding format.

The global Internet has become a gateway to information for the general public. Given the online availability of this seemingly endless resource of information, a desire to quickly access this information has driven an evolution in the telecommunications industry and, in particular, in telecommunications networks. As telecommunications networks evolve, the growth in data traffic on the networks appears to outpace the growth in voice traffic. Some industry commentators have noted that the average packet size in telecommunications networks has increased from 280 bytes to 330 bytes in 1998 alone. Additionally, these commentators have noted that the average session duration has decreased down to only 13 seconds. In summary, the growth in data traffic along with changing characteristics of the data traffic itself has forced many telecommunications service providers to seek a more efficient and higher bandwidth mechanism for transporting data traffic.

One efficient type of telecommunications network for transporting such data traffic is a packet-based telecommunications network. A packet-based telecommunications network is a communication network using protocols in which messages are divided into packets before they are sent. Each packet is individually transmitted and can follow different routes to its destination within the network. Once all of the packets forming the message have arrived at the destination, the message is recompiled from the packets and delivered as a whole message.

An example of such a packet-based telecommunications network is an IP-based network. Essentially, an IP-based network uses Internet protocol or IP as the protocol to handle addressing of packets. Some networks combine IP with a higher level protocol called transport control protocol (TCP), which establishes a virtual connection or link between a destination and a source. Those skilled in the art will be familiar with IP-based networks and the current version of IP called IPv4, which is promulgated by the Internet Engineering Task Force (IETF). A newer version of IP called IPv6 or IPng (IP Next Generation) is currently under development by IETF.

Many data networks generally rely upon a conventional Synchronous Optical Network (SONET) layer to transport data within the network. This is due to the ability of SONET to support international standards for interconnecting networks and SONET's desirably efficient use of bandwidth. Basically, SONET defines interface standards beginning at the physical layer level of the Open Systems Interconnection (OSI) Reference Network Model developed by the International Organization for Standardization (ISO). The interface standards defined by SONET describe a synchronous hierarchy of interface rates that allow data sequences at differing rates to be multiplexed within a SONET frame, which is then transmitted as an optical signal. The synchronous hierarchy of SONET results in an overhead percentage that does not vary as the rate increases. Each time one multiplexes to a higher rate, the lower-rate signals are synchronously byte-interleaved to produce the higher rate. Since the lower-rate signals are synchronous to one another, no additional overhead is needed (e.g., with stuffing bytes and associated signaling) to support rate matching. Those skilled in the art will be familiar with the OSI Reference Network Model and additional features of SONET standards, equipment and systems.

Furthermore, those skilled in the art will understand that conventional SONET systems are implemented with multiple layers. In general, each of the layers are responsible for specific functions. The lowest layer is a photonic or optical layer while other layers add functionality (such as framing, scrambling, and error monitoring) used by devices in the network. The photonic or optical layer essentially converts electrical signals to optical signals and is responsible for maintaining the pulse shape, wavelength and power levels of the optical signals. The photonic or optical layer is analogous to the physical layer as described in the OSI Reference Network Model.

While each of the other layers in SONET systems has a particular amount of overhead associated the particular layer's functionality added to the system, the photonic or optical layer has none. In other words, at the bottom layer of the network model, the photonic or optical layer adds no extra processing or data overhead to a packet of information when transmitting an optical signal representing the packet directly over the photonic or optical layer of the network.

Due to the synchronous nature of SONET, one problem that may be encountered when using SONET to transport IP packets is maintaining a synchronous clock within the network at all times. Applicant has observed that long pattern sequences of the same value may undesirably cause loss of a clock signal in the network. Typically, the bits of a packet transmitted directly over the photonic or optical layer are encoded in a conventional non-return-to-zero (NRZ) encoding format. After a finite number of consecutive bits at the same logic level, the clock signal may drop out because the optical signal being transmitted remains at a constant, DC, unmodulated level as a quasi-continuous wave state. Once the clock signal drops out, future packets may be lost when they arrive at the optical receiver because the timing of the packet is no longer synchronous.

In order to avoid this problem and help maintain a synchronous clock, the SONET layer for transporting IP packets usually scrambles the payload (conventionally referred to as a Synchronous Payload Element) of the packet. Scrambling of the payload essentially breaks up long pattern sequences that may be input to SONET equipment within the network. By breaking up the long pattern sequences, the electro-optics within SONET equipment, such as clock recovery circuitry in optical receivers, can function properly and packets are not lost.

Unfortunately, extra hardware and processing is required to scramble and unscramble (i.e., multiplex and demultiplex) the payload of an IP packet in SONET. In other words, another layer of encoding or adapting of the IP packet is required in addition to encoding bits of the IP packet directly into light pulses. For example, a conventional statistical time division multiplexer is a device within a router that accepts electrical input from a variety of sources and provides a multiplexed optical signal output representing a SONET frame (which may include an IP packet). The statistical multiplexer also has scrambling hardware to enable the router to ensure that a clock signal can be easily recovered by the receiver of the SONET frame. This extra hardware and the associated overhead for scrambling the payload of each packet is costly in terms of monetary costs, wasted bandwidth and processing resources within the network. Thus, Applicant has discovered that it would be advantageous to transmit IP packets directly over the optical or photonic layer without having to adapt the IP packet any further while simultaneously maintaining the ability to extract a clock signal at all times.

Point-to-Point (PPP) protocol is a standard method of transmitting different protocol packets, including IP packets, over point-to-point links in the network. Thus, an IP packet may be framed for transmission in the network using PPP in a frame, such as an High Level Data Link Control (HDLC)-like frame. Essentially, HDLC-like frames conform to a protocol at a data link layer allowing for control data flow and error correction. PPP in HDLC-like frames allows for framing of both bit-oriented and octet-oriented synchronous and asynchronous links. Those skilled in the art will be familiar with PPP in HDLC-like frames. Additional information about PPP in HDLC-like frames is available in RFC 1662 entitled "PPP in HDLC-like Framing" promulgated and distributed by IETF.

Another problem associated with transmitting such IP packets within a fiber optic network is that when no IP packets are being transmitted from an IP router, the IP router is in an idle state. In the idle state, the IP router must transmit some type of signal in order to maintain a synchronous clock at the receiver. Thus, the IP router typically transmits a filler signal during the idle state. Using PPP in an HDLC-like frame, the filler signal is usually characterized as a series of continuous logical ones encoded in the NRZ encoding format. Applicant has observed that in such a situation and without adapting the filler signal further, the receiver can easily lose the clock signal after a certain number of logical ones are transmitted on the photonic or optical layer.

This problem is not apparent in networks transmitting data using conventional Asynchronous Transfer Mode (ATM) transmissions because the filler has a short pattern sequence of logical ones and zeros, such as "01101010", which is repeated 48 times within the filler signal's payload. In this manner, a clock signal can be recovered when using ATM for transmitting packets directly over an optical layer. However, using ATM requires an undesirably large transport overhead and is not as efficient as IP packet transmission. For example, some lightwave industry commentators have published articles describing the ATM transport overhead as a major deficiency in network bandwidth efficiency because the ATM transport overhead can be up to 50% of the packet payload depending upon the size of the packet.

Patents and publications have generally described extracting clock signals from optical signals encoded in both NRZ encoding format and RZ encoding format. For example, U.S. Pat. No. 5,339,185 discloses an optical timing extraction circuit. The '185 patent discloses the optical timing extraction circuit capable of extracting an optical clock signal of greater than tens of Gbits/sec from an NRZ encoded signal.

Additionally, U.S. Pat. No. 5,602,862 discloses extracting a clock signal from an optical input signal encoded in either NRZ encoding format or RZ encoding format. The '862 patent discloses a transmitter generating a 5 Gbits/sec optical data signal encoded in an RZ encoding format that is then multiplexed into a 20 Gbits/sec optical pulse stream. The data signal is transmitted to a receiver where the optical data signal is received and a clock signal is optically recovered as opposed to converting the optical data signal to an electrical signal prior to clock recovery. Additionally, the '862 patent discloses operation of the optical clock extraction in the context of injecting the 5 Gbit/sec RZ encoded optical data signal directly into a novel optical clock recovery circuit.

SUMMARY OF THE INVENTION

In accordance with the invention as embodied and broadly described herein, in one aspect, a method is described for transmitting an Internet protocol (IP) packet within an IP-based fiber optic network. In general, the method begins by encoding bits of a data sequence into the IP packet using a predetermined signal-encoding format, such as a return-to-zero (RZ) encoding format. The predetermined signal-encoding format is capable of returning to a predetermined value at the beginning of each bit period of the data sequence. Next, the IP packet is transmitted to a receiver directly over an optical layer of the IP-based fiber optic network without adapting the IP packet to another encoding format outside of the optical layer. By avoiding the need to use an additional adaptation layer or other encoding format outside of the optical layer, the method advantageously reduces costs and overhead associated with transporting IP packets within the network.

Additionally, the IP packet may be received and a clock signal may be extracted from the IP packet. Typically, the clock signal is extracted by determining a repetition rate of the encoded bits of the IP packet as the clock signal.

After transmitting the IP packet and before transmitting a subsequent IP packet, a predetermined filler signal may be transmitted directly over the optical layer of the IP-based fiber optic network. The predetermined filler signal is typically a series of logical ones (e.g., a filler signal normally associated with PPP in an HDLC-like framing structure as described in RFC 1662), which have been encoded using the predetermined signal-encoding format. The optical receiver may then receive the predetermined filler signal and the clock signal may be extracted without regard to the length of the predetermined filler signal.

In another aspect, a method of communication within an Internet protocol (IP) based fiber optic network is described between an optical source and an optical receiver. In general, the method begins by receiving a data sequence at the optical source and formatting the data sequence into an IP packet. The IP packet is formatted with a first series of return-to-zero (RZ) encoded bits. Next, the IP packet is transmitted from the optical source to the optical receiver as a group of optical pulses over an optical layer of the network without using an adaptation layer in the network. Once the IP packet is received by the optical receiver, a clock signal is extracted from the IP packet by determining the repetition rate of the RZ encoded bits in the IP packet.

If the optical source is in an idle condition (e.g., the next data sequence has not yet been received), a filler signal may be formatted with a predefined state as a payload. The predefined state may include a series of RZ encoded bits indicating the idle condition of the optical source. The filler signal may then be transmitted directly over the optical layer of the IP-based fiber optic network without adapting the filler signal to another encoding format outside of the optical layer. Furthermore, the filler signal may be received by the optical receiver and the clock signal may be extracted from the filler signal without regard to the length of the filler signal.

In yet another aspect, a system is described for transmitting an Internet protocol (IP) packet within a fiber optic network. The system includes an optical source, an optical receiver and an optical fiber connecting the optical source to the optical receiver. The optical source is typically a router and has an input for receiving a data sequence and an output for transmitting the IP packet on an optical layer of the fiber optic network without adapting the IP packet to an encoding format outside the optical layer. The optical source is able to format the data sequence into the IP packet using a predetermined signal-encoding format capable of returning to a predetermined value at the beginning of each bit period within the IP packet. An example of such an encoding format is RZ encoding format. The optical receiver, which is linked to the optical source via the optical fiber, is capable of receiving the IP packet through the optical fiber and extracting a clock signal from the IP packet. The optical receiver typically includes a clock recovery circuit used to extract the clock signal from the IP packet.

In addition, when the optical source in an idle condition, the optical source may be able to transmit a filler signal over the optical layer of the network without adapting the filler signal to another encoding format outside of the optical layer. The filler signal is typically formatted by the optical source as a mark-hold state, such as a series of logical ones (e.g., the mark-hold state normally associated with using PPP in an HDLC-like framing structure as described in RFC 1662), using the predetermined signal-encoding format. Furthermore, the optical receiver may be capable of receiving the filler signal and extracting the clock signal from the filler signal without regard to a length of the filler signal.

BRIEF DESCRIPTION OF THE DRAWINGS

The accompanying drawings, which are incorporated in and constitute a part of this specification, illustrate embodiments of the invention, and together with the description, explain the advantages and principles of the invention.

FIG. 4 is a flow diagram illustrating steps for transmitting an IP packet within a fiber optic network consistent with an embodiment of the present invention.

Figure 1:
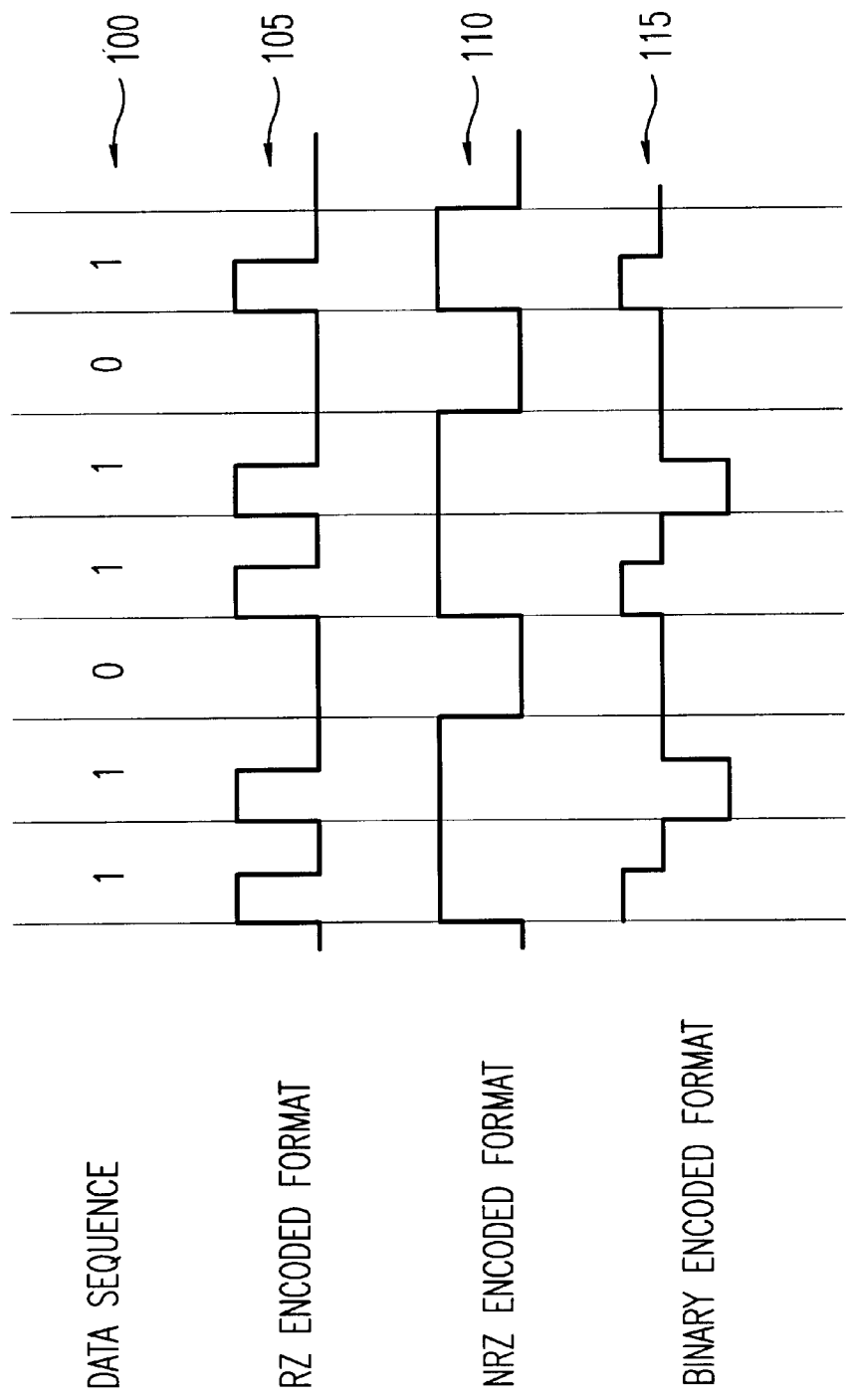
FIG. 1 is a diagram illustrating an exemplary data sequence encoded in a variety of signal-encoding formats consistent with an embodiment of the present invention.

It is to be understood that both the foregoing general description and the following detailed description are exemplary and explanatory only and are not restrictive of the invention, as claimed. The following description, as well as the practice of the invention, set forth and suggest additional advantages and purposes of this invention.

DETAILED DESCRIPTION OF THE PREFERRED EMBODIMENTS

Reference will now be made to various embodiments according to this invention, examples of which are shown in the accompanying drawings and will be obvious from the description of the invention. In the drawings, the same reference numbers represent the same or similar elements in the different drawings whenever possible.

It is known that optical signals may be encoded using a return-to-zero (RZ) encoding format and a clock signal may be extracted from the RZ encoded optical signal. However, Applicant has discovered that encoding an Internet protocol (IP) packet of data using a particular type of encoding format, such as RZ encoding, and then transmitting the encoded IP packet directly over an optical layer of the network without adapting the IP packet to another encoding scheme (e.g., without using an adaptation layer) allows for efficient transmission of the IP packet. Furthermore, Applicant has discovered that doing so simultaneously reduces the resources and overhead required to maintain a synchronous clock at all times. Systems consistent with the present invention have an optical source, an optical receiver, and an interconnecting optical fiber as part of a fiber optic network. The optical source formats a data sequence into an IP packet with an encoding format capable of returning a signal representing the IP packet to a predetermined value at the beginning of each bit period of the IP packet. In this manner, the IP packet avoids the need for additional adapting or encoding to ensure that a clock signal can be continuously extracted and packets of information are not lost when transmitting the IP packet or other pattern sequences by the optical source.

When no IP packet or other information is being transmitted by the optical source, the optical source is deemed to be in an idle state. In the idle state, the optical source provides a filler signal in order to maintain a synchronous clock with the optical receiver during the IP inter-octet time fill period. The filler signal is a general term for what is generated when no packets are being transmitted by the optical source. Typically, a particular protocol called a mark-hold state is used during such periods and states that the filler signal is a series of logical ones (i.e., 111111 ... ). Applicant has also discovered that costs and efficiencies are gained by encoding the filler signal using a predetermined encoding format and transmitting the filler signal directly over the optical layer without the overhead and expense of further adapting the filler signal at a layer above the optical layer, such as the data link layer.

Figure 2:
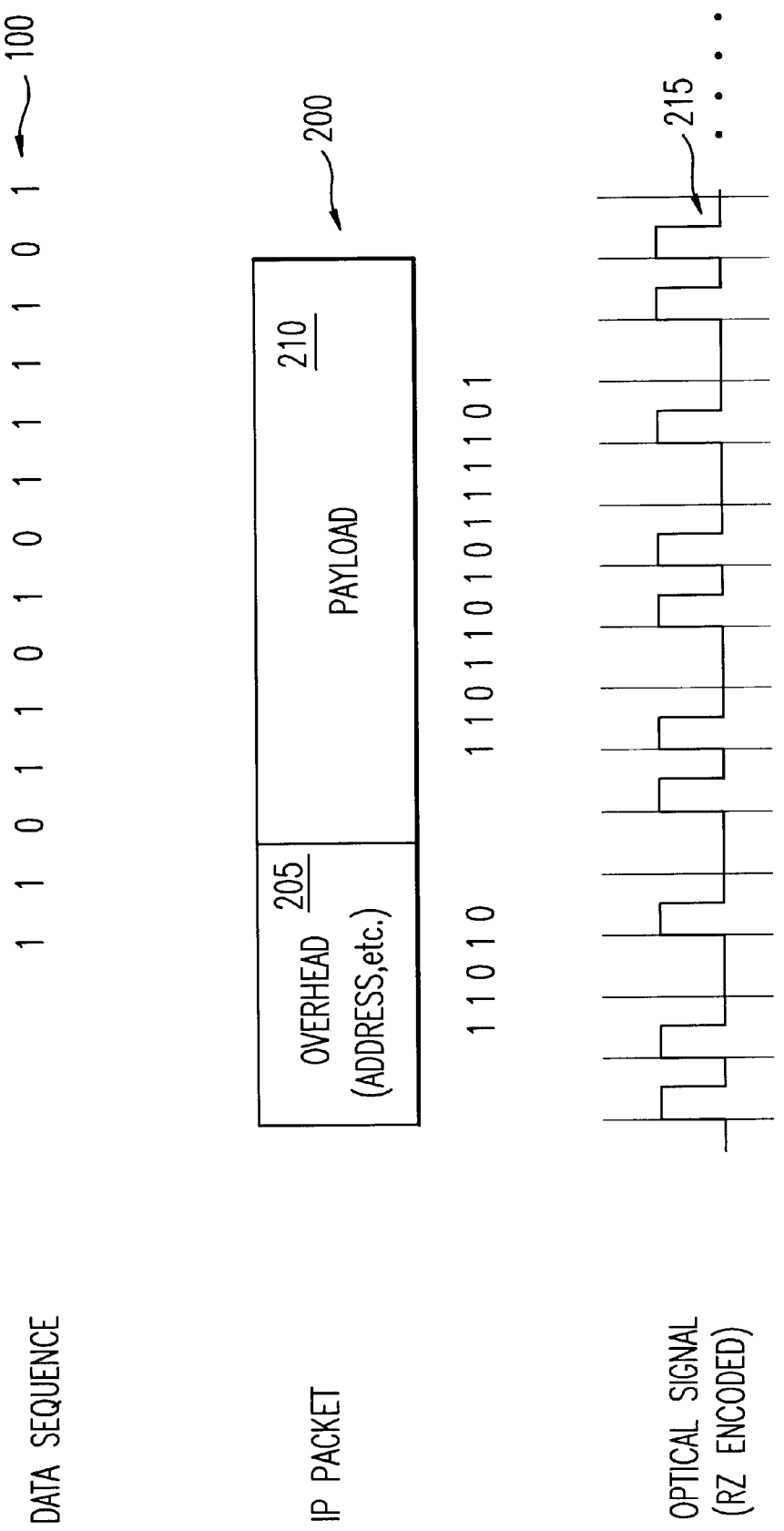
FIG. 2 is a diagram illustrating an exemplary Internet protocol (IP) packet encoded using a return-to-zero (RZ) encoding format consistent with an embodiment of the present invention.
Figure 3:
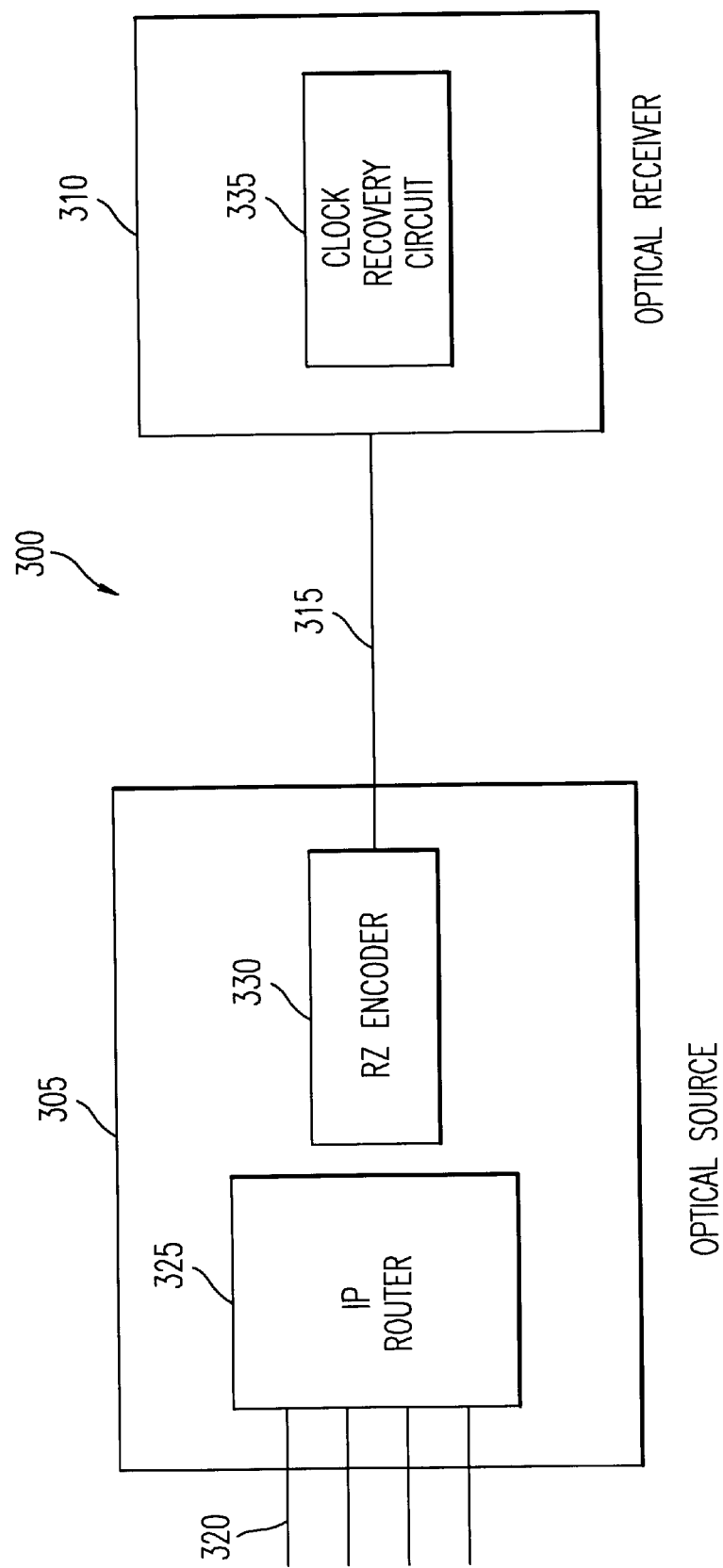
FIG. 3 is a block diagram illustrating a system for transmitting an IP packet within a fiber optic network consistent with an embodiment of the present invention.

In summary, FIG. 1 graphically illustrates signal-encoding formats for use in an embodiment of the present invention. FIG. 2 illustrates an exemplary data sequence, an IP packet formatted from the data sequence and an RZ encoded optical signal representing the IP packet. FIG. 3 is a block diagram of a system consistent with an embodiment of the present invention. FIG. 4 illustrates steps from an exemplary method for efficiently transmitting IP packets in accordance with an embodiment of the present invention.

One of the important aspects of an embodiment of the present invention is how a data sequence is encoded according to a predetermined signal-encoding format. In general, the predetermined signal-encoding format in an embodiment of the present invention is an encoding format where the signal returns to a predetermined value at the beginning of each bit period of the data sequence. FIG. 1 is a diagram illustrating an exemplary data sequence encoded in a variety of signal-encoding formats. As shown in FIG. 1, a data sequence 100 includes a series of bits represented numerically as a series of logical ones and logical zeros. These bits in data sequence 100 must be encoded as a physical signal in order to represent the logical bit values in data sequence 100 on a transport medium, such as a copper wire or optical fiber.

If data sequence 100 is encoded using a return-to-zero (RZ) encoding format, then data sequence 100 is represented as an RZ encoded signal 105. Those skilled in the art will realize that RZ encoded signal 105 is characterized as a unipolar waveform in which a logical one is represented by a high level over only part of the bit period and then returns to a low or zero level prior to the beginning of the next bit period. Thus, the RZ encoded signal 105 is encoded such that the signal 105 returns to a predetermined value (e.g., a zero value) at the beginning of each bit period.

Alternatively, if data sequence 100 is encoded using a non-return-to-zero (NRZ) encoding format, then data sequence 100 is represented as an NRZ encoded signal 110. Those skilled in the art will realize that NRZ encoded signal 110 is characterized as a waveform in which a high level represents a logical one over the entire bit period. NRZ encoded signal 110 does not return to the beginning value for each bit period like RZ encoded signal 105 does. The NRZ encoded signal 110 is encoded such that the signal 110 fails to return to a predetermined value at the beginning of each bit period. Therefore, while many IP-based fiber optic networks currently use the NRZ encoding format, embodiments of the present invention do not use the NRZ encoding format as one of the predetermined signal-encoding formats because of the difficulty in extracting a clock signal from the NRZ encoded signal 110.

Aside from the RZ encoding format, there are other signal-encoding formats contemplated by the present invention that return the signal to a predetermined value at the beginning of each bit period of the data sequence. One such encoding format is a binary signal-encoding format, also conventionally known as bipolar signaling. If data sequence 100 is encoded using the binary signal-encoding format, then data sequence 100 is graphically represented as binary encoded signal 115. The binary signal-encoding format is conventionally defined where a logical one is represented by two different values over a half-bit period of the binary encoded signal 115. Logical zero is represented by a low level during the entire bit period. Thus, three different encoded signal levels are used to represent two logic levels. In this manner, the binary encoded signal 115 is encoded such that the signal 115 returns to a predetermined value at the beginning of each bit period, similar to the RZ encoded signal 105. Those skilled in the art will be familiar with many different types of signal-encoding formats including RZ, NRZ, and binary encoding formats.

In the context of the above discussion on signal-encoding formats capable of returning the signal to a predetermined value at the beginning of each bit period, embodiments of the present invention typically begin by encoding or formatting an IP packet using such signal-encoding formats prior to transmitting the IP packet on an optical layer of the network. FIG. 2 is a diagram illustrating an exemplary IP packet encoded using the RZ encoding format consistent with an embodiment of the present invention.

As shown in FIG. 2, data sequence 100 represents part of a message to be transmitted over an IP-based fiber optic network. Prior to transmission, data sequence 100 is packaged as data within an IP packet 200. In particular, data sequence 100 is formatted as a data payload 210 within IP packet 200. Aside from payload 210, IP packet 200 has additional overhead information 205, such as the destination address for IP packet 200. In more detail, the overhead information 205 within a typical IP packet, such as IP packet 200, includes a variety of fields. In IPv4, these fields are as follows:

Version—indicates the version of IP currently being used.

IP Header Length (IHL)—indicates the header length in 32-bit words.

Type-of-service—indicates how an upper-layer protocol would like the current packet to be handled.

Total Length—indicates the overall length of the packet, including the payload.

Identification—contains an integer identifying the current packet.

Flags—3-bit field related to fragmentation of the packet.

Time-to-live—maintains a counter that gradually decrements over time before the packet is discarded in order to avoid endless looping of the packet.

Protocol—indicates which upper-layer protocol receives incoming packets after IP processing is complete.

Header Checksum—error detection indication to help to ensure IP header integrity.

Source Address—a 32-bit address specifying the sending node (e.g., an optical source).

Destination Address—a 32-bit address specifying the receiving node (e.g., an optical receiver).

Options—indicates support of certain options, such as source routing.

Upper Layer Data—for use with upper-layer protocol.

Those skilled in the art will be familiar with IP and the features of IP packet formats.

In the example illustrated in FIG. 2 (which has been simplified for the purposes of discussion), a "11011010111101" bit stream from data sequence 100 becomes payload 210 of IP packet 200 while a "11010" bit stream representing the destination address of IP packet 200 becomes overhead 205.

In order to transmit IP packet 200 as an optical signal 215 in accordance with an embodiment of the present invention, IP packet 200 is encoded using a predetermined signal-encoding format, such as an RZ encoding format. As previously mentioned, the predetermined signal-encoding format is any encoding format where the signal returns to a predetermined value at the beginning of each bit period. Referring back to the example illustrated in FIG. 2, optical signal 215 represents the encoded IP packet 200 having been formatted or encoded using an RZ encoding format. Once encoded, the IP packet 200 is transmitted directly on the optical or photonic layer of the network.

Those skilled in the art will appreciate that the OSI Reference Network Model developed by ISO describes seven protocol layers, each with a unique function. From the highest and most abstract layer to the lowest, the seven layers include an application layer, a presentation layer, a session layer, a transport layer, a network layer, a data link layer, and a physical layer (such as the optical layer). In practice, it is common that some of these layers are combined and implemented as one functional layer in a network.

Basically, the application layer (the highest layer) provides high-level program-to-program communication. The presentation layer manages data representation conversions, such as converting from conventional EBCDIC to ASCII formatted data. The session layer is responsible for establishing and maintaining communications channels while the transport layer is responsible for point-to-point integrity of data transmission. The network layer essentially routes data from one network device or node to another. The data link layer is responsible for physically passing data from one node to another and may include some adaptation, special encoding or scrambling of data to ensure the data is physically passed. Finally, the physical layer is responsible for putting data onto the network media, such as an optical fiber, and taking the data off.

Those skilled in the art will also appreciate that the use of layers above the physical layer allows a network device the advantage of abstraction to the details of the lower level implementations. However, such a use of higher level layers requires an additional overhead and expense to support the additional layers. For example, transmission of IP packets within a network has traditionally required encoding or scrambling at the data link layer, which incurs an undesirable expense and overhead. IP routers typically operate at the network layer and interface to the data link layer, which adapts packets transmitted by the IP routers prior to sending the packets out on the network via the physical layer. However, embodiments of the present invention allow transmission of IP packets using only the physical layer and avoid the undesirable and expensive additional encoding or adaptation performed on signals at adaptation layers, such as the data link layer.

Given the above preface on encoding formats, IP packets and network layers, a system consistent with an embodiment of the present invention is described. FIG. 3 is a block diagram illustrating such a system for transmitting an IP packet within a fiber optic network. As shown in FIG. 3, according to an embodiment of the present invention, an IP-based fiber optic network 300 is illustrated that includes an optical source 305, an optical receiver 310 and an optical fiber 315 interconnecting optical source 305 and optical receiver 310 as part of the fiber optic network. Optical source 305 receives input from other information or data sources in the form of data sequences on inputs 320. In general, optical source 305 is capable of receiving data, interpreting, multiplexing and further encoding the data before transmitting the encoded data (via optical fiber 315) to optical receiver 310. In an embodiment of the present invention, optical source 305 includes an IP router 325 coupled to an RZ encoder 330. IP router 325 and RZ encoder 330 operate to format, encode and transmit IP packets in an RZ signal-encoding format from data sequences received. In this manner, signals coming into IP router 325 and RZ encoder 330 are formatted and encoded into the predetermined signal-encoding format. The encoded IP packets are transmitted by RZ encoder 330 directly on the optical layer of the network without adapting the IP packets at a data link layer of the network. While IP router 325 and RZ encoder 330 are illustrated as separate devices in FIG. 3, it is contemplated that a single device can accomplish the formatting, encoding and transmitting of such IP packets consistent with embodiments of the present invention.

While optical source 305 is illustrated in FIG. 3 to include IP router 325 within a network, it is contemplated that optical source 305 may also be more generally defined to include an electrical signal source (not shown). The electrical signal source can format or encode an IP packet from a data sequence to be multiplexed within a larger frame of information. Router 325 and encoder 330 typically formats and encodes the larger frame of information, including the packet, as a series of formatted light pulses for transmission to optical receiver 310.

In the prior art, optical source 305 typically included a scrambler used to adapt or further encode packets of data at a data link layer. A data link layer within the controls the scrambler. This was how routers typically resolved problems with long data sequences and dropped clocks were avoided. However, those skilled in the art will understand that the use of scramblers incurs a material cost and bandwidth performance penalty. Thus, the use of scramblers requires additional overhead and processing leading to less efficient IP packet transmission and increased cost.

In an embodiment of the present invention, it is important to realize that a scrambler or other data link layer encoding or adaptation is no longer needed within optical source 305. Optical source 305 is capable of encoding or formatting an IP packet using a predetermined signal-encoding format, such as RZ encoding, and then transmitting the encoded packet directly over an optical layer of the network. In this manner, the IP packet is encoded and transmitted in such a way that optical receiver 310 is always capable of recovering a clock signal from the packet without depending upon the data link layer.

As optical source 305 transmits the encoded IP packet on the optical layer of the network, physical light waves representing the transmitted and encoded packet travel from optical source 305 to optical receiver 310 via optical fiber 315. Optical receiver 310 is typically another router or other network device within the network. In general, optical receiver 310 is any type of network device configured to receive packets of information transmitted from optical source 305 and recover or extract a clock from optical signals received from optical source 305. In the exemplary embodiment illustrated in FIG. 3, optical receiver 310 includes a clock recovery circuit 335 capable of extracting a clock signal from light pulses received by optical receiver 310. In more detail, clock recovery circuit 335 is a conventional clock recovery circuit capable of determining a repetition rate associated with the received light pulses. The repetition rate represents the clock signal used to synchronize optical receiver 310 and optical source 305.

When using the NRZ signal-encoding format, receipt of a consecutive series of ones can be hampered because the light level received by clock recovery circuit 335 remains at a constant, DC, unmodulated level. This is what happens when IP packets are transported using PPP in an HDLC-like frame. Typically, the clock signal can only be recovered from the series for a finite number of consecutive ones, after which the clock signal will usually be lost. Normally, this depends upon frequency or wavelength selective features, such as the quality factor (Q), of clock recovery circuit 335. In this manner, if optical receiver 310 loses the ability to extract the clock signal, optical receiver 310 will effectively be "asleep" and unable to properly respond when the next packet arrives from optical source 305. After losing several bits or even numerous packets, optical receiver 310 may recover and begin to extract the clock signal again, thus allowing receipt of packets of information once again.

However, in an embodiment of the present invention, if RZ encoded signals are used (such as an IP packet encoded over PPP using the RZ signal-encoding format), a long series of consecutive ones can be received by optical source 310. Furthermore, while receiving the RZ encoded signals, the clock signal can be continuously extracted without regard to how long the series is. Therefore, encoding IP packets with a predetermined signal-encoding format and transmitting the encoded IP packets directly over an optical layer without further adaptation or encoding of the IP packet allows optical receiver 310 to extract the clock signal at all times.

When optical source 305 has not received more information to transmit to optical receiver 310, a filler signal must be provided by optical source 305 to optical receiver 310 in order to maintain synchronization between optical source 305 and optical receiver 310. In general, the filler signal is a predetermined signal indicating an idle condition of optical source 305. The filler signal may also referred to as a filler packet when the filler signal is to be routed to a specific network element, such as optical receiver. The filler packet typically has a predefined state, such as a mark-hold state indicating the optical receiver is in the idle condition. In the exemplary embodiment of the present invention, the filler signal is a series of logical ones provided to optical receiver before the next data sequence is formatted for transmission and is defined by RFC 1662 promulgated by IETF.

Conventionally, this period of time is referred to as an IP inter-octet time fill when no packets are coming out of IP router 325.

Those skilled in the art will appreciate that the spectral content of the mark-hold state of consecutive logical ones transmitted as a stream of RZ encoded light pulses at 10 Gbits/sec is similar to an alternating sequence of logical ones and zeros transmitted as a stream of NRZ encoded light pulses at 20 Gbits/sec. Thus, using such a predetermined signal-encoding format generates a strong spectral component representing a clock and facilitates clock recovery.

Upon entering the idle condition, optical source 305 transmits the filler signal (encoded with the predetermined signal-encoding format) to optical receiver 310. In this manner, optical receiver 310 is made aware that no important IP packets or other data are being transmitted. Upon receipt of the filler signal, optical receiver 310 engages clock recovery circuit 335 to continue extracting a clock signal from the encoded filler signal. Thus, using the encoded filler signal, system 300 is capable of efficiently transmitting IP packets while continuously extracting a clock signal so that later transmitted IP packets are properly received by optical receiver 310.

FIG. 4 is a flow diagram illustrating steps from a method for transmitting an IP packet within a fiber optic network consistent with an embodiment of the present invention. As shown in FIG. 4, the method 400 begins at step 405 where a data sequence is received. In the example illustrated in FIG. 3, IP router 325 receives the data sequence on one of inputs 320.

In general, steps 410 and 415 converts an input signal, such as the data sequence, into an optical signal encoded in a predetermined signal-encoding format. The encoded optical signal is transmitted directly over an optical layer of the network without adapting the encoded signal at the data link layer of the network.

In more detail, the data sequence is formatted by encoding bits of the data sequence into an IP packet using a predetermined signal-encoding format at step 410. The predetermined signal-encoding format is generally defined to be any encoding format capable of returning a signal representing the IP packet to a predetermined value at the beginning of each bit period of the IP packet. In the exemplary embodiment, the IP packet is represented as a series of RZ encoded bits, typically transported using PPP in an HDLC-like framing structure as described in RFC 1662.

At step 415, the encoded IP packet is transmitted directly over an optical (also referred to as a photonic layer) of the network without adapting the IP packet to another encoding format. More particularly stated, the encoded IP packet skips any other adaptation layer of the network (such as the data link layer) and is transmitted directly on the optical layer of the network. In the example illustrated in FIG. 3, the IP packet is encoded and is transmitted directly on the optical layer (via optical fiber 315) via IP router 325 and RZ encoder 330 without being adapted or further encoded by a data link layer.

At step 420, the encoded IP packet is received after being transmitted through optical fiber 315. Once received, a clock recovery circuit typically engages the encoded IP packet in order to extract a clock signal from the encoded IP packet at step 425. In this manner, the clock signal can be assuredly extracted at all times while maintaining a more advantageous level of bandwidth efficiency within the IP-based fiber optic network.

At step 430, if the next data sequence has been received or, more generally stated, if the optical source is in an idle condition, then step 430 proceeds to step 435. Otherwise, data traffic is continuing to flow through the optical source and step 430 proceeds back to step 410 to encode and transmit the next data sequence as another IP packet.

In general, steps 435–450 involve how clock synchronization is maintained during an idle condition of the optical source. As previously mentioned, the idle condition is when no packets are being encoded and transmitted from the optical source. In such a situation, some type of signal must be sent to the optical receiver in order to maintain a synchronous clock signal.

In more detail, a filler signal is formatted with a predefined state using the predetermined signal-encoding format at step 435. The predefined state is generally defined as data indicating that the optical source is in the idle condition and, more particularly stated, is typically a series of logical ones (as defined in RFC 1662) in an RZ encoding format.

At step 440, the filler signal is transmitted directly over the optical layer of the network without adapting the filler signal to any other encoding format. Thus, despite the fact that a long sequence of logical ones may be transmitted to an optical receiver, there is no adapting or scrambling of the filler signal.

At step 445, the optical receiver receives the filler signal. At step 450, the received filler signal is used for extracting a clock signal. In this manner, a clock signal can be extracted when either data is transmitted by the optical source and when the optical source is in an idle condition and a filler signal is transmitted. After step 450, method 400 returns to step 430 to determine if the idle condition is over or if another filler signal must be sent to the optical receiver in order to maintain the ability to continuously extract a synchronous clock signal.

In summary, Applicant has discovered that it is efficient and less resource intensive to encode an IP packet using a particular type of encoding format, such as RZ encoding, and then transmit the encoded IP packet directly over an optical layer of the network without adapting the IP packet to another encoding format. This advantageously avoids the need to use any adaptation or additional encoding (such as scrambling from SONET) at a data link layer. An exemplary embodiment of the present invention is part of an IP-based fiber optic network and includes optical source 305, optical fiber 315 and optical receiver 310. Optical source 305 formats or, more particularly stated, encodes a data sequence into an IP packet using a predetermined encoding format. The predetermined encoding format is one that is capable of returning a signal representing the IP packet to a predetermined value at the beginning of each bit period of the IP packet. In this manner, the IP packet avoids the need for additional adapting or encoding to ensure that a clock signal can be continuously extracted and packets of information are not lost when transmitting the IP packet or other pattern sequences by optical source 305 to optical receiver 310.

When optical source 305 is in an idle state, optical source 305 provides a filler signal to optical receiver 310. In particular, the filler signal typically is formatted as a mark-hold state of a series of logical ones. If the mark-hold state is encoded in the NRZ encoding format, the clock will undesirably drop out. However, Applicant has discovered that encoding the mark-hold state using the predetermined signal-encoding format avoids drop-out of the clock while costs and efficiencies are gained. These costs and efficiencies are gained by encoding the filler signal using the predetermined encoding format and transmitting the filler signal directly over the optical layer without the overhead and expense of further adapting the filler signal.

It will be apparent to those skilled in the art that various modifications and variations can be made to systems and methods of the present invention without departing from the spirit or scope of the invention. For example, the optical source and optical receiver depicted in the figures are intended to be exemplary of preferred embodiments. The precise encoding, multiplexing, and clock recovery devices may readily be altered by one of ordinary skill in the art to obtain the equivalent encoding and transmitting system as disclosed herein without departing from the spirit or scope of this invention. The present invention covers the modifications and variations of this invention provided they come within the scope of the appended claims and their equivalents.

What is claimed is:

1. A method for transmitting an internet protocol (IP) packet within an IP-based fiber optic network, comprising the steps of:
    encoding bits of a data sequence into the IP packet using a predetermined signal-encoding format capable of returning to a predetermined value at the beginning of each bit period of the data sequence; and
    transmitting the IP packet to a receiver directly over an optical layer of the IP-based fiber optic network without adapting the IP packet to another encoding format at a data link layer.

2. The method of claim 1, wherein the encoding step further comprises encoding the bits of the data sequence into the IP packet using a return-to-zero (RZ) encoding format as the predetermined signal-encoding format.

3. The method of claim 1 further comprising receiving the IP packet and extracting a clock signal from the IP packet.

4. The method of claim 3, wherein the extracting step further comprises determining a repetition rate of the encoded bits as the clock signal.

5. The method of claim 3 further comprising transmitting a predetermined filler signal directly over the optical layer of the IP-based fiber optic network after transmitting the IP packet and before transmitting a subsequent IP packet, the predetermined filler signal being encoded using the predetermined signal-encoding format.

6. The method of claim 5, wherein the step of transmitting the predetermined filler signal further comprises transmitting a series of logical ones which have been encoded using the predetermined signal-encoding format.

7. The method of claim 6 further comprising receiving the predetermined filler signal and extracting the clock signal from the predetermined filler signal without regard to a length of the predetermined filler signal.

8. The method of claim 3 further comprising receiving a large pattern sequence of bits as the data sequence and wherein the step of encoding the bits further comprises encoding the large pattern sequence into the IP packet using the predetermined signal-encoding format without breaking up the large pattern sequence of bits within a payload of the IP packet.

9. A method of communication within an internet protocol (IP) based fiber optic network between an optical source and an optical receiver, comprising the steps of:
    receiving a data sequence at the optical source;
    formatting the data sequence into an IP packet having a first series of return-to-zero (RZ) encoded bits;
    transmitting the IP packet from the optical source to the optical receiver as a plurality of optical pulses over an optical layer of the IP-based fiber optic network without using an adaptation layer in the IP-based fiber optic network;
    receiving the IP packet by the optical receiver; and
    extracting a clock signal from the IP packet by determining the repetition rate of the first series of RZ encoded bits in the IP packet.

10. The method of claim 9 further comprising the steps of:
    determining if the optical source is in an idle condition;
    formatting a filler signal with a predefined state as a payload in the filler signal if the optical source is in the idle condition, the predefined state having a second series of RZ encoded bits indicating the idle condition of the optical source; and
    transmitting the filler signal directly over the optical layer of the IP-based fiber optic network without adapting the filler signal to another encoding format at a data link layer.

11. The method of claim 10, wherein the step of sending the filler signal further comprises transmitting the filler signal having a series of logical ones as the payload, the series of logical ones being encoded in the RZ encoding format.

12. The method of claim 10 further comprising receiving the filler signal by the optical receiver and extracting the clock signal from the second series of RZ encoded bits without regard to a length of the second series of RZ encoded bits.

13. The method of claim 10, wherein the determining step further comprises determining if a next data sequence has not yet been received at the optical source as the idle condition.

14. The method of claim 9 further comprising receiving a large pattern sequence of bits as the data sequence and wherein the formatting step further comprises formatting the large pattern sequence into the IP packet having a third series of RZ encoded bits without scrambling the large pattern sequence of bits within a payload of the IP packet.

15. A system for transmitting an internet protocol (IP) packet within a fiber optic network, comprising:
    an optical source having an input for receiving a data sequence and an output for transmitting the IP packet on an optical layer of the fiber optic network without adapting the IP packet to an encoding format at a data link layer, the optical source being capable of formatting the data sequence into the IP packet using a predetermined signal-encoding format capable of returning to a predetermined value at the beginning of each bit period within the IP packet;
    an optical fiber having a first end connected to the output of the optical source; and
    an optical receiver connected to a second end of the optical fiber, the optical receiver being operative to receive the IP packet through the optical fiber and extract a clock signal from the IP packet.

16. The system of claim 15, wherein the optical source is a router and is further capable of transmitting a filler signal over the optical layer of the fiber optic network without adapting the filler signal to another encoding format at the data link layer during an idle state of the router, the filler signal being formatted as a mark-hold state using the predetermined signal-encoding format; and
    wherein the optical receiver is further operative to receive the filler signal and to extract the clock signal from the filler signal without regard to a length of the filler signal.

17. The system of claim 16, wherein the mark-hold state is a series of logical ones generated by the router during the idle state.

18. The system of claim 17, wherein the predetermined signal-encoding format is a return-to-zero (RZ) encoding format.

19. The system of claim 18, wherein the optical receiver is further operative to extract the clock signal by determining a repetition rate associated with a plurality of light pulses encoded in the RZ encoding format representing the IP packet and the filler signal.

20. The system of claim 15, wherein the optical source is further operative to format a large pattern sequence of bits as the data sequence into the IP packet without scrambling the large pattern sequence of bits within a payload of the IP packet.

21. The system of claim 20, wherein the optical receiver is further operative to receive the large pattern sequence of bits within the IP packet without losing the clock signal.

22. The system of claim 15, wherein the optical receiver includes a clock recovery device for extracting the clock signal.

* * * * *